United States Patent [19]
Kimura et al.

[11] Patent Number: 6,023,287
[45] Date of Patent: Feb. 8, 2000

[54] METHOD AND APPARATUS FOR IMAGE SELECTION IN IMAGE TRANSMISSION SYSTEM

[75] Inventors: Yasuhiro Kimura; Tatsunori Kanai; Toshio Shirakihara; Toshihiko Shimokawa; Hiroshi Yao, all of Kanagawa, Japan

[73] Assignee: Kabushiki Kaisha Toshiba, Kawasaki, Japan

[21] Appl. No.: 08/805,225

[22] Filed: Feb. 24, 1997

[30] Foreign Application Priority Data

Feb. 28, 1996 [JP] Japan ..................................... 8-041576

[51] Int. Cl.[7] ..................................... H04N 7/00
[52] U.S. Cl. .............................. 348/39; 348/38; 345/327; 345/333
[58] Field of Search ................................... 707/3, 4, 5, 6, 707/103, 104; 382/305; 348/13, 24, 38, 39; 345/115, 327, 333

[56] References Cited

U.S. PATENT DOCUMENTS

| | | | |
|---|---|---|---|
| 5,432,871 | 7/1995 | Novik ...................................... | 382/232 |
| 5,544,354 | 8/1996 | May et al. ............................... | 395/600 |
| 5,550,966 | 8/1996 | Drake et al. ............................ | 395/154 |
| 5,574,845 | 11/1996 | Benson et al. ......................... | 395/118 |
| 5,579,471 | 11/1996 | Barber et al. .......................... | 395/326 |
| 5,583,561 | 12/1996 | Baker et al. ............................ | 348/7 |
| 5,610,653 | 3/1997 | Abecassis ............................... | 348/110 |
| 5,647,058 | 7/1997 | Agrawal et al. ........................ | 395/601 |
| 5,659,742 | 8/1997 | Beattie et al. .......................... | 395/615 |
| 5,729,730 | 3/1998 | Wlaschin et al. ....................... | 395/603 |

OTHER PUBLICATIONS

Bimbo et al. "Image Retrieval by Elastic Matching of Shapes and Image Patterns" Proceedings of Multimedia 96 pp. 215–218, Sep. 1996.

Arisawa "Design of Multimedia Database and a Query Language for Video Image Data" Proceedings of Multimedia 96, pp. 462–467, Sep. 1996.

Yoshitaka et al. "V–QBE: Video Database Retreival by Means of Example Motion of Objects" Proceedings of Multimedia 96, pp.453–457, Sep. 1996.

Hsu et al. "A Knowledge–Based Approach for Retriving Images by Content" IEEE Transactions on Knowledge and Data Engineering, vol. 8, No. 4, pp. 522–532.

Day et al. "Object–Oriented Conceptual Modeling of Video Data" IEEE, pp. 401–408, Feb. 1995.

Mehrotra et al. "Feature–Based Retrieval of Similar Shapes" IEEE, pp. 108–115, Feb. 1993.

Bach et al. "A Visual Information Management System for the Interactive Retrieval of Faces" IEEE Transactions on Knowledge and Data Engineering, vol. 5, No. 4, pp. 619–628, Aug. 1993.

Blostein et al. "Detecting Small, Moving Objects in Image Sequences Using Sequential Hypothesis Testing" IEEE Transactions on Signal Processing, vol. 39, No. 7, pp. 1611–1629, Jul. 1991.

Iu et al. "Estimation of General Rigid Body Motion from a Long Sequence of Images" IEEE, pp. 217–219, Feb. 1990.

Yoshinobu Tonomura, et al., "Structured Video Computing", IEEE Multimedia, vol. 1, No. 3, Fall 1994, pp. 34–43.

*Primary Examiner*—Paul V. Kulik
*Attorney, Agent, or Firm*—Oblon, Spivak, McClelland, Maier & Neustadt, P.C.

[57] ABSTRACT

A scheme for image selection in an image transmission system for transmitting images from an image source to an image display device, capable of eliminating a need for the viewer to select the desired image by actually watching individual images and easily selecting the desired image in which a specific desired target of the viewer is shown. Feature information for identifying targets shown in each image is obtained, while a desired feature information for identifying a desired target specified by the viewer is entered. Then, the desired image which contains the desired target specified by the viewer is selected according to the obtained feature information and the entered desired feature information. The feature information may be obtained by recognizing targets shown in each image provided by the image source, or may be generated in advance in correspondence to images provided by the image source.

20 Claims, 15 Drawing Sheets

METHOD AND APPARATUS FOR IMAGE SELECTION IN IMAGE TRANSMISSION SYSTEM

BACKGROUND OF THE INVENTION

1. Field of the Invention

The present invention relates to a method and an apparatus for image selection to be used in an image transmission system for transmitting desired images of a viewer such as a VOD (Video On Demand) system and a CATV (Cable TV) system.

2. Description of the Background Art

The TV broadcast of an sport event often employs a broadcasting scheme in which a plurality of images with different ranges or angles are taken by a plurality of cameras and the broadcast image is switched among these plurality of images in time.

In such a case, a timing for switching images and a selection of an image to be switched next are decided by the image sending side such as an editor at the broadcast station, but the timing and the selection decided by the image sending side are often not desired ones from a viewpoint of the image receiving side, that is, the individual viewer. For instance, in a case of the TV broadcast of a marathon, the broadcast image usually follow the top runner closely, so that even when the top runner has a safe lead against the second runner while there is a heated competition for the fifth place and the viewer actually wishes to watch this fifth place competition, the broadcast image may still follow the top runner for the most times and the fifth place competition may be shown only briefly.

In order to resolve a viewer's dissatisfaction in such a case, there is a proposition of a scheme in which the viewer is provided with a function for selecting any desired one of a plurality of broadcast images on a plurality of broadcast channels, at a remote controller of a TV set, so that the viewer can select the desired image at the desired timing.

However, in this scheme for providing a function to select the image at the viewer side, the following new problem arises. Namely, when many selection target images are provided from the image sending side, the viewer is required to switch around many images in order to find the desired image in which the desired target is shown. Moreover, in a case where the image showing the desired target is shifted from one image to another quickly, it is quite difficult for the viewer to select the image showing the desired target in the first place.

SUMMARY OF THE INVENTION

It is therefore an object of the present invention to provide a method and an apparatus for image selection in an image transmission system for transmitting images from an image source to an image display device, capable of eliminating a need for the viewer to select the desired image by actually watching individual images and easily selecting the desired image in which a specific desired target of the viewer is shown.

It is another object of the present invention to provide a method and an apparatus for image selection in an image transmission system, capable of avoiding unnecessary image switching at an image display device in a case of selecting a desired video image of the viewer from a plurality of video images.

According to one aspect of the present invention there is provided a method for selecting a desired image of a viewer from a plurality of images provided by an image source, in an image transmission system for transmitting images from the image source to an image display device, the method comprising the steps of: obtaining feature information for identifying targets shown in each of said plurality of images; entering a desired feature information for identifying a desired target specified by the viewer; and selecting the desired image which contains the desired target specified by the viewer from said plurality of images according to the feature information obtained at the obtaining step and the desired feature information entered at the entering step.

According to another aspect of the present invention there is provided a method for selecting a desired video image of a viewer from a plurality of video images provided by an image source, in an image transmission system for transmitting video images from the image source to an image display device, the method comprising the steps of: sequentially obtaining feature information for identifying targets shown in each of said plurality of video images at sequential timings; entering a desired feature information for identifying a desired target specified by the viewer; and sequentially selecting the desired video image which contains the desired target specified by the viewer from said plurality of video images according to the feature information sequentially obtained at the sequentially obtaining step and the desired feature information entered at the entering step when a prescribed image selection condition is satisfied.

According to another aspect of the present invention there is provided an apparatus for selecting a desired image of a viewer from a plurality of images provided by an image source, at a viewer side in an image transmission system for transmitting images from the image source to an image display device, the apparatus comprising: means for obtaining feature information for identifying targets shown in each of said plurality of images; means for entering a desired feature information for identifying a desired target specified by the viewer; and means for selecting the desired image which contains the desired target specified by the viewer from said plurality of images according to the feature information obtained by the obtaining means and the desired feature information entered by the entering means.

According to another aspect of the present invention there is provided an apparatus for selecting a desired image of a viewer from a plurality of images provided by an image source, at an image source side in an image transmission system for transmitting images from the image source to an image display device, the apparatus comprising: means for obtaining feature information for identifying targets shown in each of said plurality of images; and means for receiving a desired feature information for identifying a desired target specified by the viewer from a viewer side, and selecting the desired image which contains the desired target specified by the viewer from said plurality of images according to the feature information obtained by the obtaining means and the desired feature information received from the viewer side.

According to another aspect of the present invention there is provided an apparatus for selecting a desired image of a viewer from a plurality of images provided by an image source, at a viewer side in an image transmission system for transmitting images from the image source to an image display device, the apparatus comprising: means for entering a desired feature information for identifying a desired target specified by the viewer; and means for receiving feature information for identifying targets shown in each of said plurality of images, the feature information being generated at an image source side in correspondence to said plurality of images and provided from the image source side, and selecting the desired image which contains the desired target specified by the viewer from said plurality of images according to the feature information received from the image source side and the desired feature information entered by the entering means.

According to another aspect of the present invention there is provided an apparatus for selecting a desired image of a viewer from a plurality of images provided by an image source, at an image source side in an image transmission system for transmitting images from the image source to an image display device, the apparatus comprising: means for providing feature information for identifying targets shown in each of said plurality of images, the feature information being generated in correspondence to said plurality of images at an image source side; and means for receiving a desired feature information for identifying a desired target specified by the viewer from a viewer side, and selecting the desired image which contains the desired target specified by the viewer from said plurality of images according to the feature information provided by the providing means and the desired feature information received from the viewer side.

According to another aspect of the present invention there is provided an article of manufacture, comprising: a computer usable medium having computer readable program code means embodied therein for causing a computer to function as a device for selecting a desired image of a viewer from a plurality of images provided by an image source in an image transmission system for transmitting images from the image source to an image display device, the computer readable program code means including: first computer readable program code means for causing said computer to obtain feature information for identifying targets shown in each of said plurality of images; second computer readable program code means for causing said computer to receive a desired feature information for identifying a desired target specified by the viewer from a viewer side; and third computer readable program code means for causing said computer to select the desired image which contains the desired target specified by the viewer from said plurality of images according to the feature information obtained by the first computer readable program code means and the desired feature information received by the second computer readable program code means.

According to another aspect of the present invention there is provided an article of manufacture, comprising: a computer usable medium having computer readable program code means embodied therein for causing a computer to function as a device for selecting a desired image of a viewer from a plurality of images provided by an image source in an image transmission system for transmitting images from the image source to an image display device, the computer readable program code means including: first computer readable program code means for causing said computer to receive feature information for identifying targets shown in each of said plurality of images from an image source side; second computer readable program code means for causing said computer to receive a desired feature information for identifying a desired target specified by the viewer from a viewer side; and third computer readable program code means for causing said computer to select the desired image which contains the desired target specified by the viewer from said plurality of images according to the feature information received by the first computer readable program code means and the desired feature information received by the second computer readable program code means.

Other features and advantages of the present invention will become apparent from the following description taken in conjunction with the accompanying drawings.

DETAILED DESCRIPTION OF THE PREFERRED EMBODIMENTS

Figure 1:
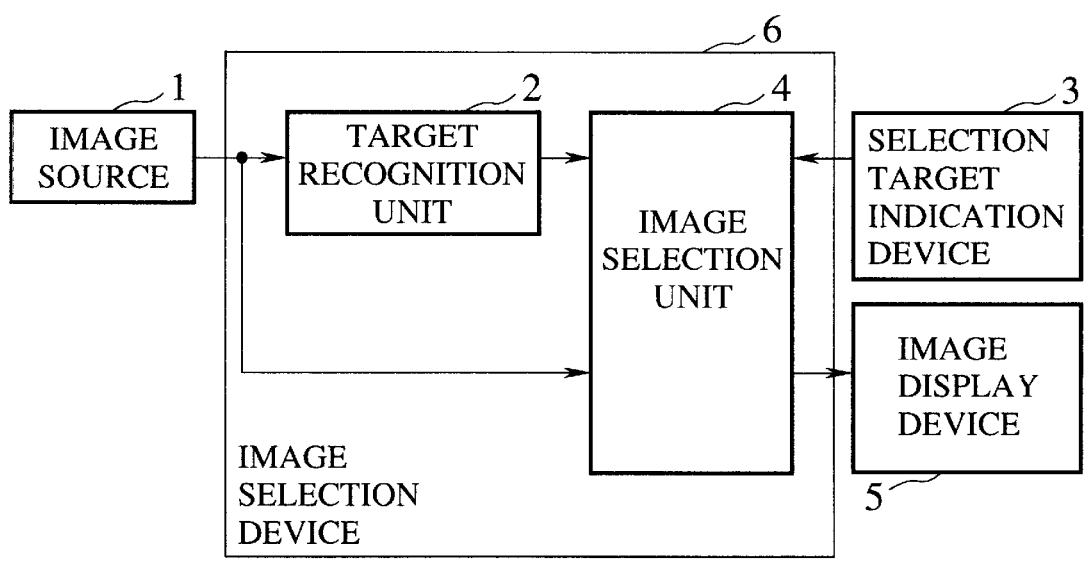
FIG. 1 is a block diagram of an exemplary configuration of an image transmission system in the first embodiment of the present invention.
Figure 2A:
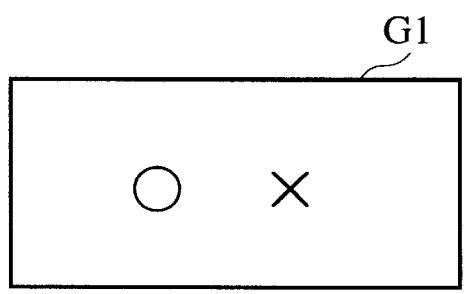
FIGS. 2A to 2D are illustrations of exemplary images used in the image transmission system of FIG. 1.
Figure 2B:
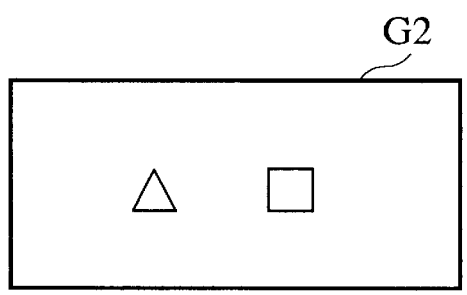
Figure 2C:
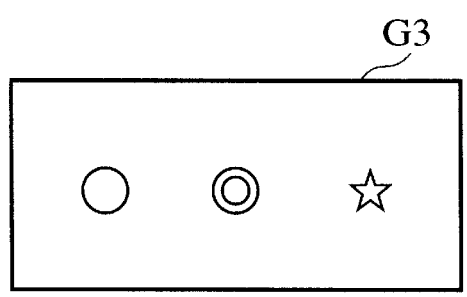
Figure 2D:
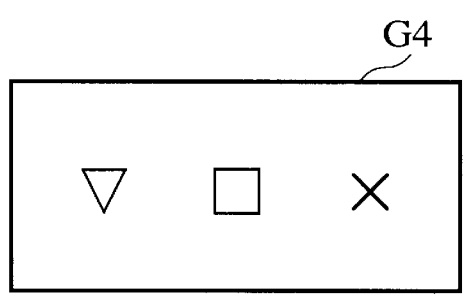
Figure 3:
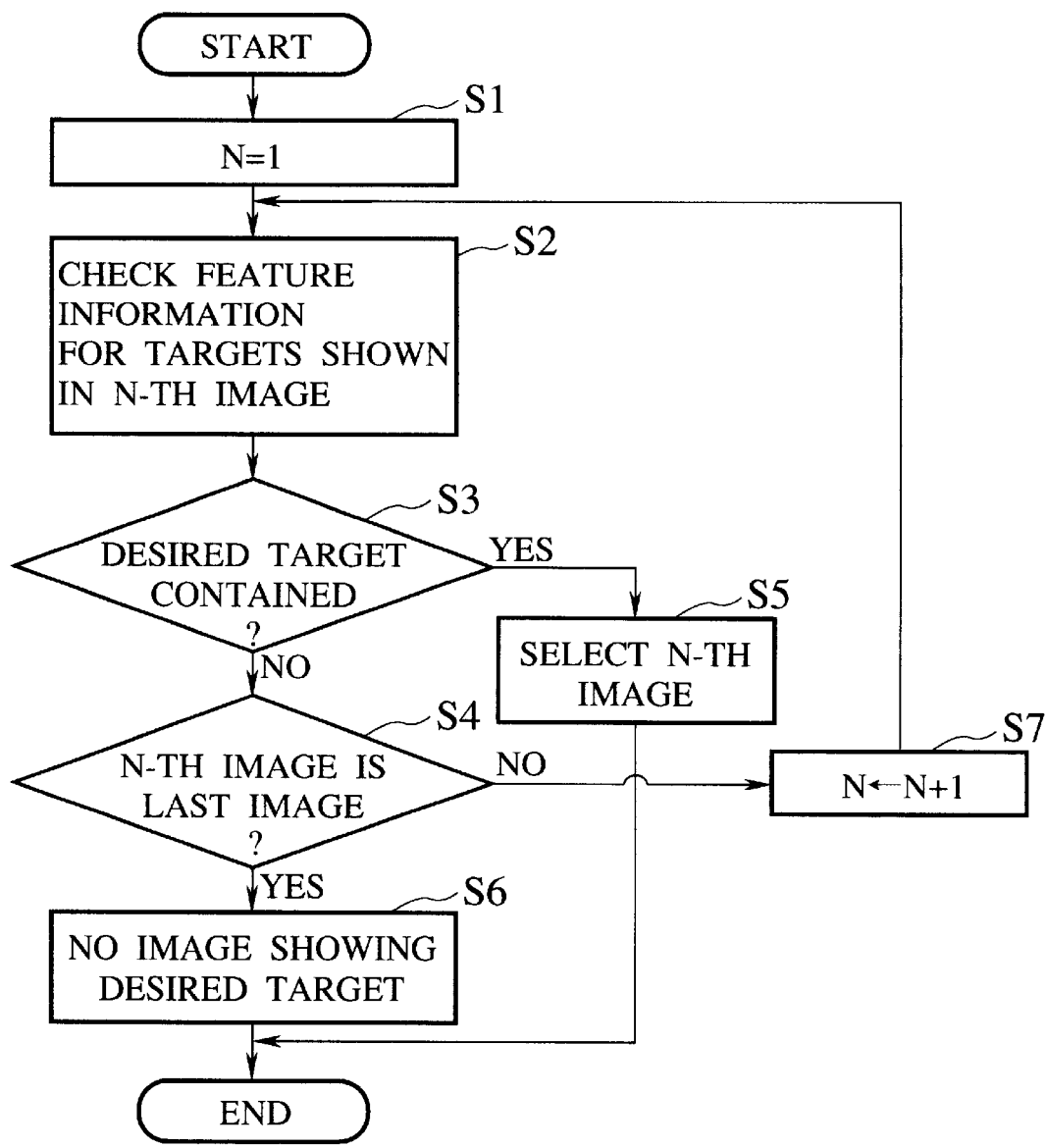
FIG. 3 is a flow chart for the operation of the image transmission system of FIG. 1.

Referring now to FIG. 1 to FIG. 3, the first embodiment of a method and an apparatus for image selection according to the present invention will be described in detail.

FIG. 1 schematically shows an overall configuration of an image transmission system in this first embodiment.

In FIG. 1, an image source 1 is an element for generating images to be presented to each viewer, such as a video camera or laser disk playback device, or a TV broadcast station for providing CATV service or VOD service.

A target recognition unit 2 is an element which receives images from the image source 1, recognizes targets shown in each image, and outputs a feature information for the recognized targets. For example, when four images G1 to G4 showing geometric figures as shown in FIGS. 2A to 2D are received from the image source 1, the target recognition unit 2 recognizes the geometric figures shown in these images G1 to G4 by means of the figure recognition.

A selection target indication device 3 is a device for entering a feature information for a desired target indicating a desired target of each viewer, and transmitting the entered feature information to an image selection unit 4.

The image selection unit 4 is an element for selecting an image in which the desired target specified by the viewer is shown among a plurality of images provided from the image source 1, according to the feature information for targets shown in individual image received from the target recognition unit 2 and the feature information for the desired target received from the selection target indication device 3, and transmits to the selected image to an image display device 5.

The image display device 5 is a device for displaying the image selected by the image selection unit 4.

Note that an image selection device 6 formed by the target recognition unit 2 and the image selection unit 4 may be provided at the image providing station side along with the image source 1, or at each viewer's home. Note also that the image selection device 6 may be divided into two physically separated parts, such that the target recognition unit 2 of the image selection device 6 is provided at the image providing station side along with the image source 1 while the image selection unit 4 of the image selection device 6 is provided at each viewer's home, if desired.

Next, the overall operation of the image transmission system shown in FIG. 1 will be described.

Now, suppose that four images G1 to G4 showing the geometric figures as shown in FIGS. 2A to 2D are generated from the image source 1, and the desired target of the viewer is a double circle ⊚. Namely, the feature information for the specific target specified by the viewer as entered at the selection target indication device 3 indicates the double circle.

The target recognition unit 2 receives the four images G1 to G4 from the image source 1 and recognizes all the targets (figures) shown in each image. As a result, the target recognition unit 2 outputs the following feature information for targets contained in each of the four images G1 to G4.

(Image G1, circle, cross)

(Image G2, triangle, square)

(Image G3, circle, double circle, star)

(Image G4, inverted triangle, square, cross)

On the other hand, the feature information for the desired target is entered by the viewer at the selection target indication device 3 in the following format, for example.

(double circle)

Then, the image selection unit 4 receives the feature information for each image from the target recognition unit 2 and the feature information for the viewer's desired target from the selection target indication device 3, and selects the image G3 which is showing the target specified by the viewer (double circle).

Now, the operation procedure of the image selection device 6 in this first embodiment will be described with reference to the flow chart of FIG. 3.

First, a variable N for counting a number of images entered at the image selection unit 4 is initially set to "1" (step S1).

Then, at the target recognition unit 2, targets shown in the N-th image are recognized and the feature information for the recognized targets are outputted to the image selection unit 4 (step S2). The image selection unit 4 checks whether the targets expressed by the feature information for the targets shown in the N-th image as entered from the target recognition unit 2 contains a target matching with the desired target expressed by the feature information for the desired target of the viewer as entered from the selection target indication device 3 (step S3), and when the matching target exists, this N-th image is selected (step S5) and the operation is terminated.

On the other hand, when the N-th image does not contain any matching target, whether this N-th image is the last image or not is checked (step S4). When this N-th image is not the last image so that there are other images to be checked, the variable N is incremented by "1" (step S7), and the operation returns to the step S2. This process is repeated until the image containing the desired target of the viewer is found at the step S3, or the checking of all the images is finished at the step S4.

When it is judged that the N-th image is the last image at the step S4, it is decided that the image showing the desired target of the viewer does not exist among a plurality of images currently entered from the image source 1 to the image selection device 6 (step S6).

By means of this operation of FIG. 3, the image selection device 6 selects the image G3 which shows the desired target of the viewer (double circle) among the images G1 to G4 shown in FIGS. 2A to 2D, and sends this selected image G3 to the image display device 5. The image display device 5 receives this image G3 from the image selection device 6 and displays this image G3 to the viewer.

Referring now to FIG. 4 to FIG. 8, the second embodiment of a method and an apparatus for image selection according to the present invention will be described in detail.

In the first embodiment described above, the feature information of the targets shown in individual image is generated by the target recognition unit 2 within the image selection device 6, but the present invention is not limited to this particular case. This second embodiment concerns with a case in which the feature information is transmitted from the external of the image selection device.

Figure 4:
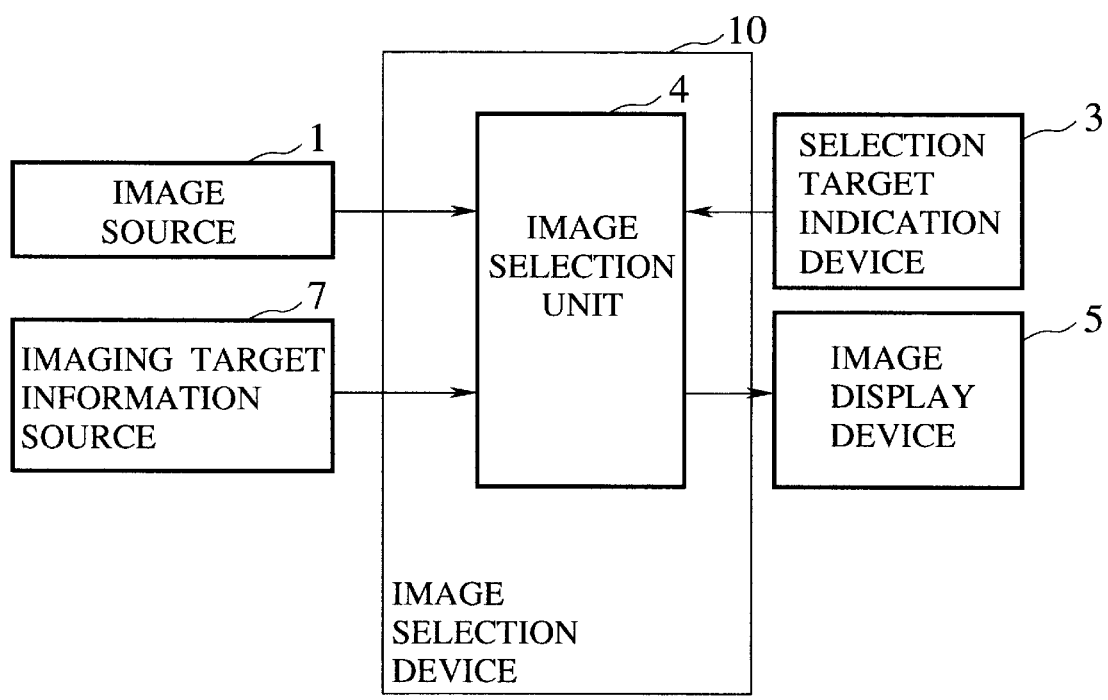
FIG. 4 is a block diagram of an exemplary configuration of an image transmission system in the second embodiment of the present invention.

FIG. 4 schematically shows an overall configuration of an image transmission system in this second embodiment.

In FIG. 4, the feature information for the targets shown in individual image is generated at an imaging target information source 7 in advance, which is provided at the image providing station side along with the image source 1. In synchronization with each image transmitted from the image source 1 to an image selection device 10, the feature information for targets shown in that each image is transmitted from the imaging target information source 7 to the image selection device 10.

The image selection unit 4 provided in the image selection device 10 selects an image in which the desired target specified by the viewer is shown among a plurality of images provided from the image source 1, according to the feature information for targets shown in individual image received from the imaging target information source 7 and the feature information for the desired target received from the selection target indication device 3, and transmits to the selected image to the image display device 5.

Note that an image selection device 10 formed by the image selection unit 4 may be provided at the image providing station side along with the image source 1 and the imaging target information source 7, or at each viewer's home. Note also that the imaging target information source 7 at the image providing station side may be replaced by the target recognition unit similar to that of FIG. 1 which is provided at the image providing station side and which generates the feature information for the targets shown in individual image as the individual image is supplied by the image source 1, if desired.

Figure 5:
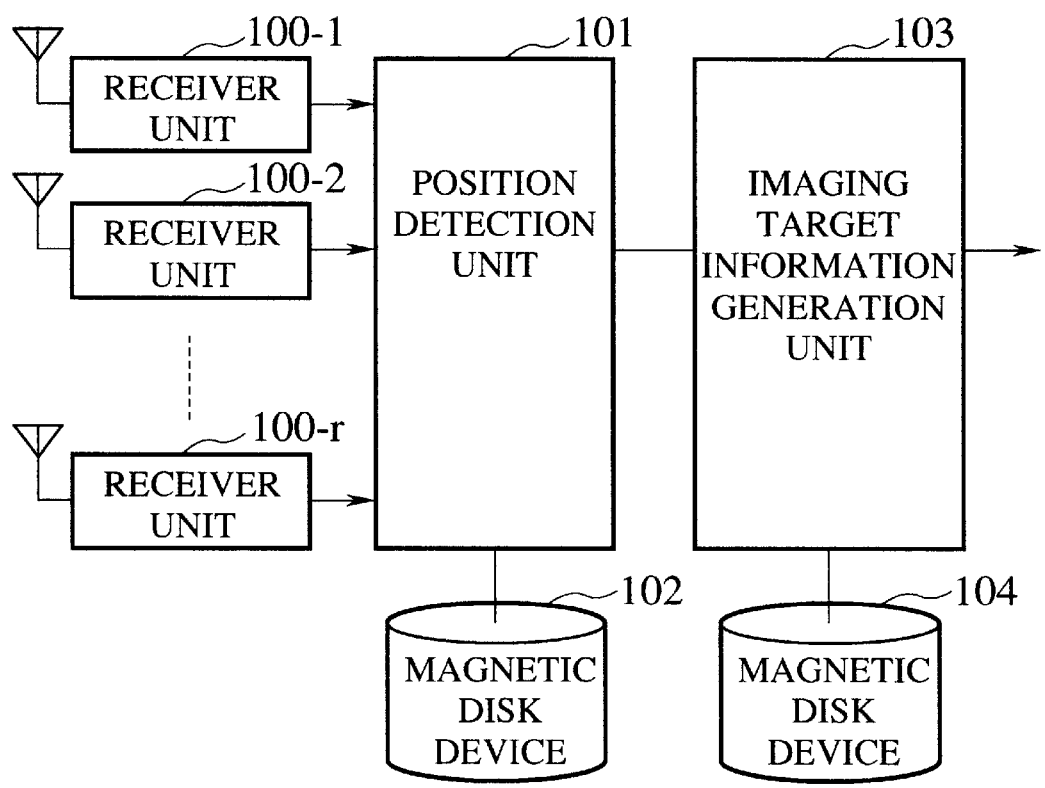
FIG. 5 is a block diagram of an exemplary imaging target information source in the image transmission system of FIG. 4.

Now, an exemplary configuration of the imaging target information source 7 in an exemplary case of a horse race broadcast, in which an image showing a specific horse is to be selected from a plurality of images taken by a plurality of TV cameras, will be described with reference to FIG. 5.

In this case, a compact radio transmitter is mounted on a saddle of each horse participating in the race. The radio transmitters are set to transmit radio signals of different frequencies so that which signal is transmitted from which radio transmitter can be recognized. On the other hand, along the race track, a number of antennas for receiving radio signals transmitted from the radio transmitters (m sets in total) are provided at predetermined locations. As shown in FIG. 5, the individual antenna is connected to a respective one of receiver units 100-1 to 100-r which can identify the source transmitter of the radio signal from the radio signal received by the individual antenna, and all the receiver units 100-1 to 100-r are connected to a position detection unit 101.

Here, by setting the output power of each transmitter and the receiving sensitivity of each receiver unit appropriately, it is possible to realize a setting in which the radio signal transmitted from the transmitter mounted on the saddle of one horse running in the race track can be always received by one of the receiver units alone and not by more than one receiver units simultaneously. Consequently, in such a setting, the output from each receiver unit can be expressed in the format of (transmitter M') where M' (M'=1, 2, . . . , m) is a transmitter number for sequentially labelling each transmitter, for example.

A magnetic disk device 102 stores data concerning a correspondence between the transmitter number of each transmitter and the horse number M of the horse to which each transmitter is mounted, in the format of (transmitter M', horse number M). For instance, the magnetic disk device 102 stores data such as (transmitter-1, horse number-4), (transmitter-2, horse number-1), and so on.

The position detection unit 101 outputs an information indicating a correspondence between each horse and the receiver unit which received the radio signal from that each horse, in the format of (horse number M, receiver R), where R (R =1, 2, . . . , r) is a receiver number for sequentially labelling each receiver unit and a corresponding antenna connected thereto (an antenna and a receiver unit can be referred to collectively as a receiver), according to the output of the receiver unit and the data stored in the magnetic disk device 102. For instance, the position detection unit 101 outputs information such as (horse number-1, receiver-1), (horse number-2, receiver-5), and so on.

Since the antenna is provided at the predetermined position, the position of each horse can be detected by determining which receiver received the radio signal from each horse.

Now, assuming that each camera is not changing its position, angle and zooming rate, a range of the race track imaged by each camera is always constant. Consequently, the range of the race track imaged by each camera can be stored as data in the magnetic disk device 104 in advance. Here, the range of the race track imaged by each camera stored in the magnetic disk device 104 is expressed by using the camera number K (K =1, 2, 3, . . . ) for sequentially labelling each camera and receiver numbers of the receivers located at left and right edges of the range imaged by each camera, in the format of (camera-1, receiver-1, receiver-2), (camera-2, receiver-2, receiver-3), and so on.

The imaging target information generation unit 103 outputs an information as to which horse is shown in which image taken by which camera, according to the information indicating the correspondence between each horse and the receiver which received the radio signal from that each horse as given from the position detection unit 101 and the information indicating the range of the race track imaged by each camera as given from the magnetic disk device 104. For example, the output of the imaging target information generation unit 103 is given in terms of the camera number and the horse number, in the format of (camera-1, horse number-2, horse number-5), (camera-2, horse number-1), and so on.

Now, the operation procedure of the imaging target information generation unit 103 in this second embodiment will be described with reference to the flow chart of FIG. 6.

First, the horse number M is initialized to "1" (step S10), and the receiver number R corresponding to the horse number M is checked according to the information sent from the position detection unit 101 (step S11).

Next, the camera number K is initialized to "1" (step S12), and whether the horse number M is shown in the image taken by the camera K or not is checked according to the range imaged by the camera K which is read out from the magnetic disk device 104. Namely, the data on the range of the race track taken by the camera K is read out from the magnetic disk device 104 (step S13), and whether the receiver R is contained in this range or not is checked (step S14). When the receiver R is contained in this range, the horse number M is temporarily stored in correspondence to the camera number K as the horses shown in the image taken by the camera K (step S15), whereas otherwise, this step S15 is skipped.

Next, whether the camera K is the last camera or not, that is, whether the checking as to the receiver R is contained in the range imaged by each camera is carried out for all the cameras or not, is checked. When the camera K is not the last camera, that is, when there is another camera for which the checking is not yet carried out, the camera number K is incremented by "1" (step S18), and the operation returns to the step S13. The steps S13 to S16 are repeated until the checking is completed for all the cameras.

Then, whether the horse number M is the last horse number or not, that is, the search of the image is finished for all the horses or not, is checked (step S17). When the horse number M is not the last horse number, that is, when there is another horse number for which the image search is not yet carried out, the horse number M is incremented by "1" (step S19), and the operation returns to the step S11. The steps S11 to S17 are repeated until the image search is completed for all the horses.

Figure 6:
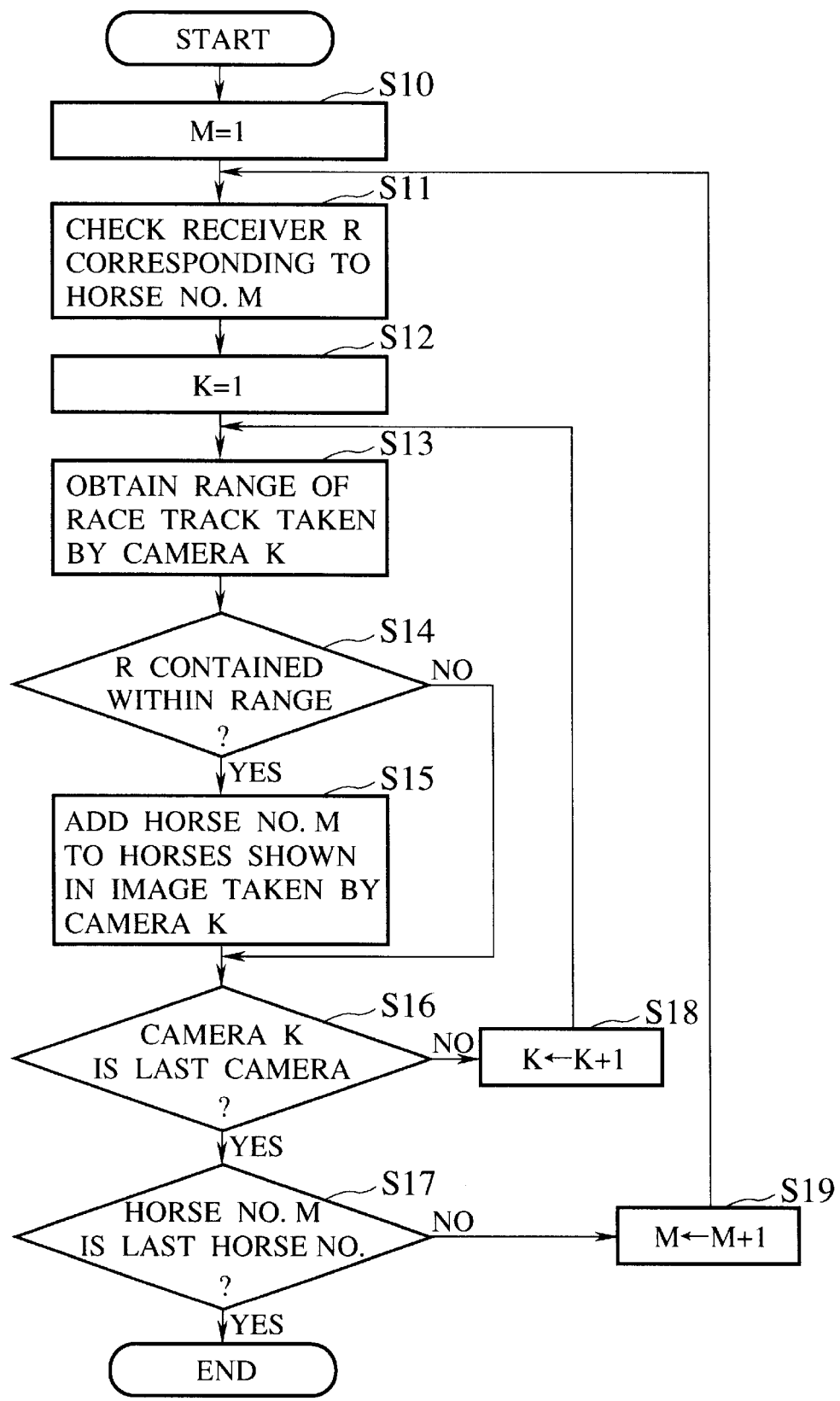
FIG. 6 is a flow chart for the operation of an imaging target information generation unit in the imaging target information source of FIG. 5.

By means of this operation of FIG. 6, the horse numbers M corresponding to each camera number K as eventually stored in the imaging target information generation unit 103 are outputted from the imaging target information source 7 as the feature information for the targets in the image taken by each camera K.

It is to be noted that, in the image transmission systems of FIG. 1 and FIG. 4 for the first and second embodiments described above, the image is directly selected by the image selection unit 4 from the images provided by the image source 1, but the present invention is not necessarily limited to this particular case. For example, as shown in FIG. 7, it is possible to use the image selection device 15 having the image selection unit 4 which carries out the above described operation of FIG. 3 and sends an information for identifying the selected image to the image display device 5, while the image display device 5 displays only the corresponding image among the images transmitted from the image source 1.

Figure 7:
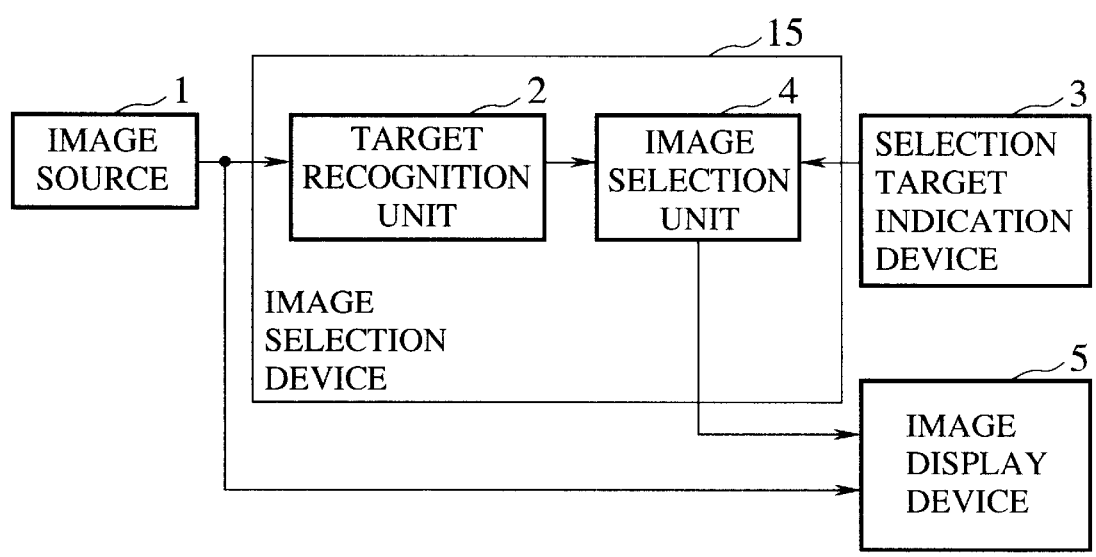
FIG. 7 is a block diagram of an alternative configuration of an image transmission system in the first embodiment of the present invention.
Figure 8:
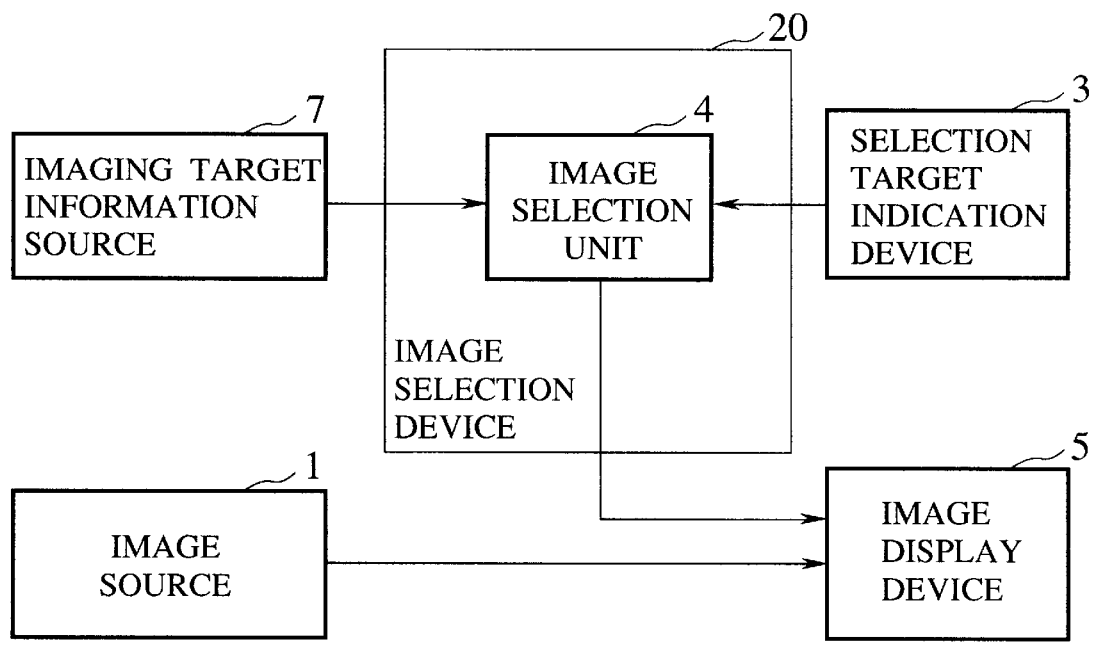
FIG. 8 is a block diagram of an alternative configuration of an image transmission system in the second embodiment of the present invention.

It is also possible to use a configuration as shown in FIG. 8 in which the configurations of FIG. 4 and FIG. 7 are combined. Namely, in the configuration of FIG. 8, the feature information for targets shown in individual image is sent from the imaging target information source 7 provided at the external of the image selection device 20. The image selection unit 4 in the image selection device 20 carries out the above described operation of FIG. 3 according to the feature information sent from the imaging target information source 7 and the feature information for the desired target of the viewer sent from the selection target indication device 3, and sends an information for identifying the selected image to the image display device 5, while the image display device 5 displays only the corresponding image among the images transmitted from the image source 1.

As described, according to the first and second embodiments described above, for each of a plurality of images provided by the image source 1, the feature information for the imaging targets of each image is generated at the target recognition unit 2, or the feature information for the imaging targets contained in each image which is generated in advance is received from the imaging target information source 7, and the image containing the target specified by the viewer is selected by the image selection unit 4 from a plurality of images provided by the image source 1 according to the feature information for the imaging targets of each image and the feature information for the desired target which is specified by the viewer through the selection target indication device 3, and the selected image is displayed by the image display device 5. Consequently, at a time of selecting the image showing the specific desired target of the viewer from a plurality of images, it is possible to eliminate a need for the viewer to select the desired image by actually watching individual image and it is possible to easily select the desired image showing the specific desired target of the viewer.

Figure 9:
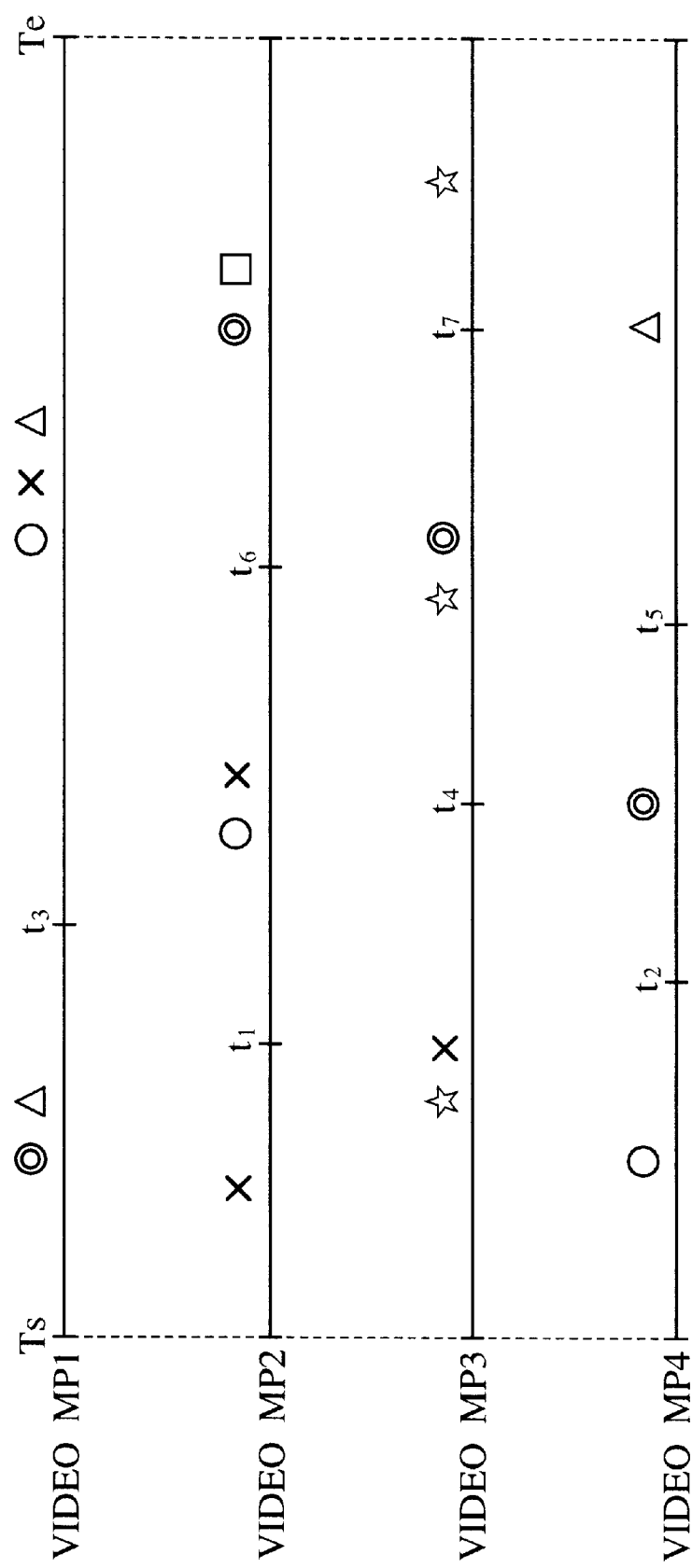
FIG. 9 is a diagram for explaining exemplary video images used in the third embodiment of the present invention.
Figure 10A:
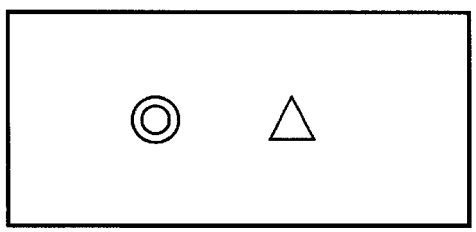
FIGS. 10A and 10B are illustrations of exemplary images for one video image at different times used in the third embodiment of the present invention.
Figure 10B:
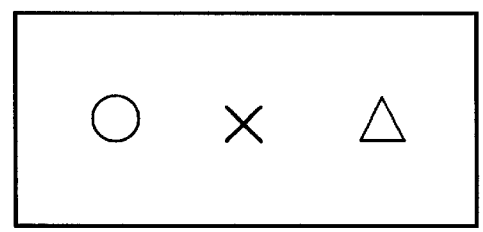
Figure 11:
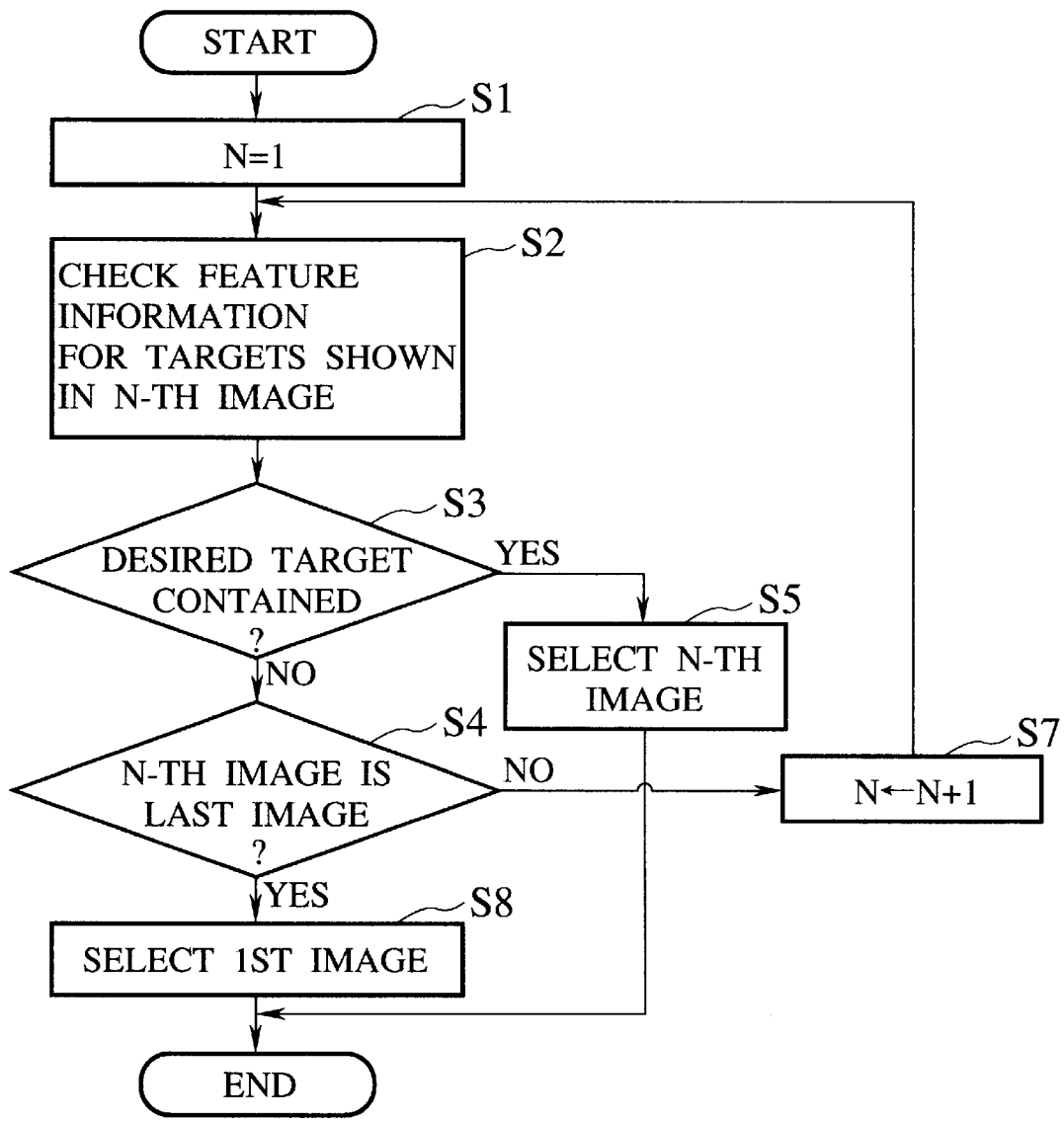
FIG. 11 is a flow chart for the operation of an image transmission system in the third embodiment of the present invention.

Referring now to FIG. 9 to FIG. 11, the third embodiment of a method and an apparatus for image selection according to the present invention will be described in detail. This third embodiment is directed to a case where the images to be selected are video images.

In general, in a case where the images to be selected are video images, the targets shown in each video image changes in time. For example, consider a case of selecting the image showing the double circle ⊙ among four video images MP1 to MP4 as shown in FIG. 9. In this FIG. 9, the horizontal axis represents time. Consequently, the video image MP1 shows an image as shown in FIG. 10A from the time Ts to the time t3, and an image as shown in FIG. 10B from the time t3 to the time Te, for example.

In the following, it is assumed that the image selection device 6 as shown in FIG. 1 is used in this third embodiment.

The target recognition unit 2 of the image selection unit 6 receives four video images MP1 to MP4 shown in FIG. 9 from the image source 1.

Here, if the image is selected without accounting for the change in time of the targets shown in each video image, that is, if the image selection is carried out only at the beginning of the video images, the target recognition unit 2 recognizes the targets shown in each image at the time Ts of the beginning of the video images, and obtains the following feature information for each video image.

(Video image MP1, double circle, triangle)

(video image MP2, cross)

(Video image MP3, star, cross)

(video image MP4, circle)

When these feature information are given to the image selection unit 4, the video image MP1 is selected by the image selection unit 4 according to these feature information, so that the video image MP1 is displayed by the image display device 5.

As a result, the video image MP1 will be selected even after the time t3 even though this video image MP1 does not show the double circle after the time t3 and there is another image which shows the double circle after the time t3.

In order to avoid such an inconvenient image selection, this third embodiment uses the following processing which accounts for the fact that the images to be selected are the video images.

First, at the time Ts, the target recognition unit 2 recognizes the targets shown in each image at the time Ts, and obtains the following feature information for each video image.

(Video image MP1, double circle, triangle)

(Video image MP2, cross)

(Video image MP3, star, cross)

(video image MP4, circle)

When these feature information are given to the image selection unit 4, the video image MP1 is selected by the image selection unit 4 according to these feature information, so that the video image MP1 is displayed by the image display device 5.

Next, as time elapsed to the time t3, the target recognition unit 2 recognizes the targets shown in each image at the time t3, and obtains the following feature information for each video image.

(Video image MP1, circle, cross, triangle)

image MP2, circle, cross)

(Video image MP3, star, cross)

(video image MP4, double circle)

When these feature information are given to the image selection unit 4, the image selection unit 4 detects an occurrence of a change or a disappearance of the desired target in the feature information for the currently selected video image MP1, so that the video image MP4 is newly selected.

Note that, in the above, the re-selection of the video image is carried out when the image selection unit 4 detects an occurrence of a change or a disappearance of the desired target in the feature information for the currently selected video image, but it is also possible to carry out the re-selection of the video image at a predetermined regular time interval (in which case the previously selected video image may be selected again as a result this re-selection). It is also possible for the target recognition unit 2 to initiate the re-selection of the video image upon detecting an occurrence of a change in the feature information for each image.

Then, as time elapsed further to the time t5, the target recognition unit 2 obtains the following feature information for each video image by the similar operation as described above.

(Video image MP1, circle, cross, triangle)

(Video image MP2, circle, cross)

(Video image MP3, star, double circle)

(video image MP4, triangle)

When these feature information are given to the image selection unit 4, the image selection unit 4 newly selects the video image MP3 by the similar operation as described above.

Then, as time elapsed further to the time t7, the target recognition unit 2 obtains the following feature information for each video image by the similar operation as described above.

(Video image MP1, circle, cross, triangle)
(Video image MP2, double circle, square)
(Video image MP3, star)
(video image MP4, triangle)

When these feature information are given to the image selection unit 4, the image selection unit 4 newly selects the video image MP2 by the similar operation as described above.

By means of this operation, it is possible to avoid the above described inconvenient image selection by which the video image which no longer shows the desired target is continually selected despite of the presence of another video image which now shows the desired target.

Now, when the images to be selected are the images G1 to G4 as shown in FIGS. 2A to 2D, suppose that the viewer specified a black dot as the desired target. In this case, if the selection is made according to the operation shown in FIG. 3, the undesired state of not displaying any image would be caused as there is no image which shows the desired target and therefore no image would be selected.

In order to avoid such an undesired state, it is possible to use the operation as shown in the flow chart of FIG. 11, for example. In FIG. 11, those steps which are substantially the same as the corresponding steps of FIG. 3 are given the same reference numerals in the figure, and only the steps different from those of FIG. 3 will be described here. More specifically, the operation of FIG. 11 differs from the operation of FIG. 3 in that the step S6 of FIG. 3 is replaced by the step S8.

At this step S8, when there is no image which shows the desired target of the viewer among a plurality of images entered from the image source 1 to the image selection device 6, the predetermined one of these plurality of images (the first image in this example) is selected.

Then, when the image selection unit 4 detects an occurrence of a change in the feature information entered from the target recognition unit 2, or else at a predetermined regular time interval, the selection of the image showing the desired target of the viewer among these plurality of images is carried out again according to the operation of FIG. 11.

Also, when the image showing the desired target of the viewer is selected at the steps S3 and S5 of FIG. 11, it is possible to carry out the re-selection of the image according to the operation of FIG. 11 when the image selection unit 4 detects an occurrence of a change or a disappearance of the desired target in the feature information for the currently selected video image.

By means of this operation, the first image among the plurality of images will be selected when there is no image which shows the desired target, so that it is possible to avoid the undesired state in which no image is displayed by the image display device 5.

It is to be noted that the selection of the first image among the plurality of images at the step S8 of FIG. 11 described above is only an example of a prescribed selection rule that can be used in the present invention, and any suitable prescribed selection rule may be used instead. For instance, a random generator for generating a random number Q may be provided so that the Q-th image rather than the first image will be selected at the step S8 of FIG. 11 when there is no image which shows the desired target, so as to avoid the undesired state in which no image is displayed by the image display device 5 similarly as in a case of FIG. 11 described above.

Figure 12:
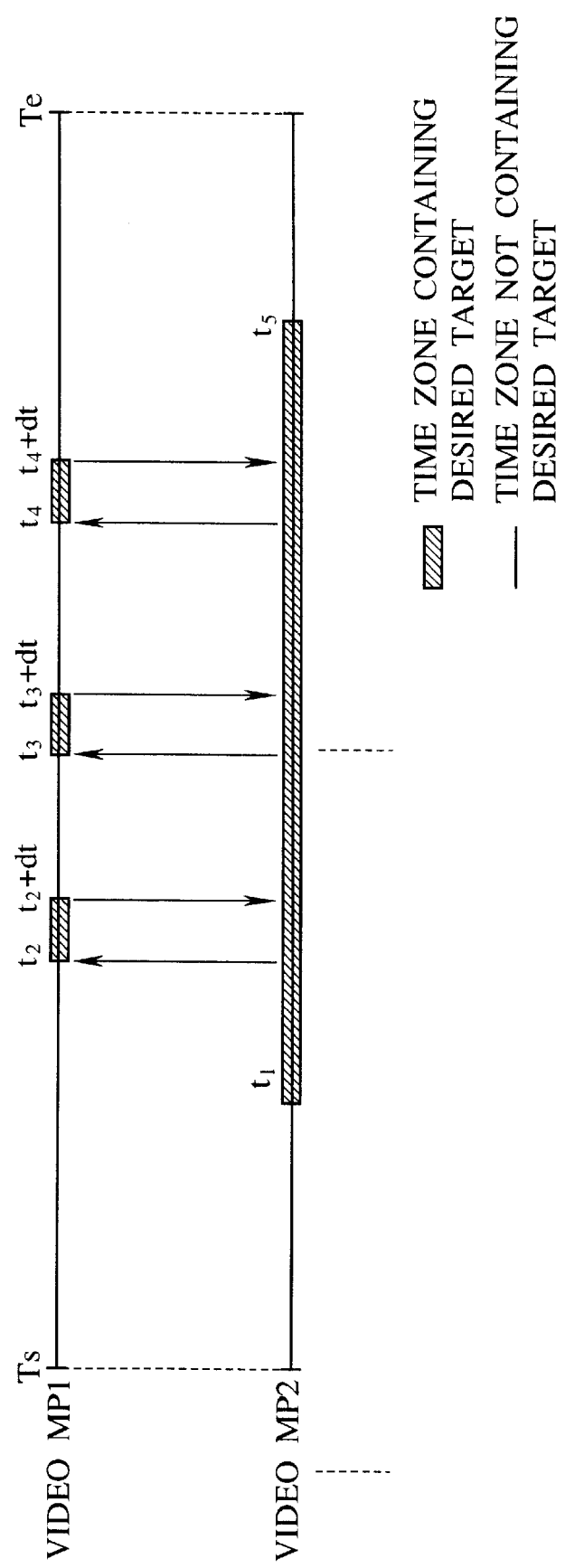
FIG. 12 is a diagram for explaining exemplary video images used in the fourth embodiment of the present invention.
Figure 13:
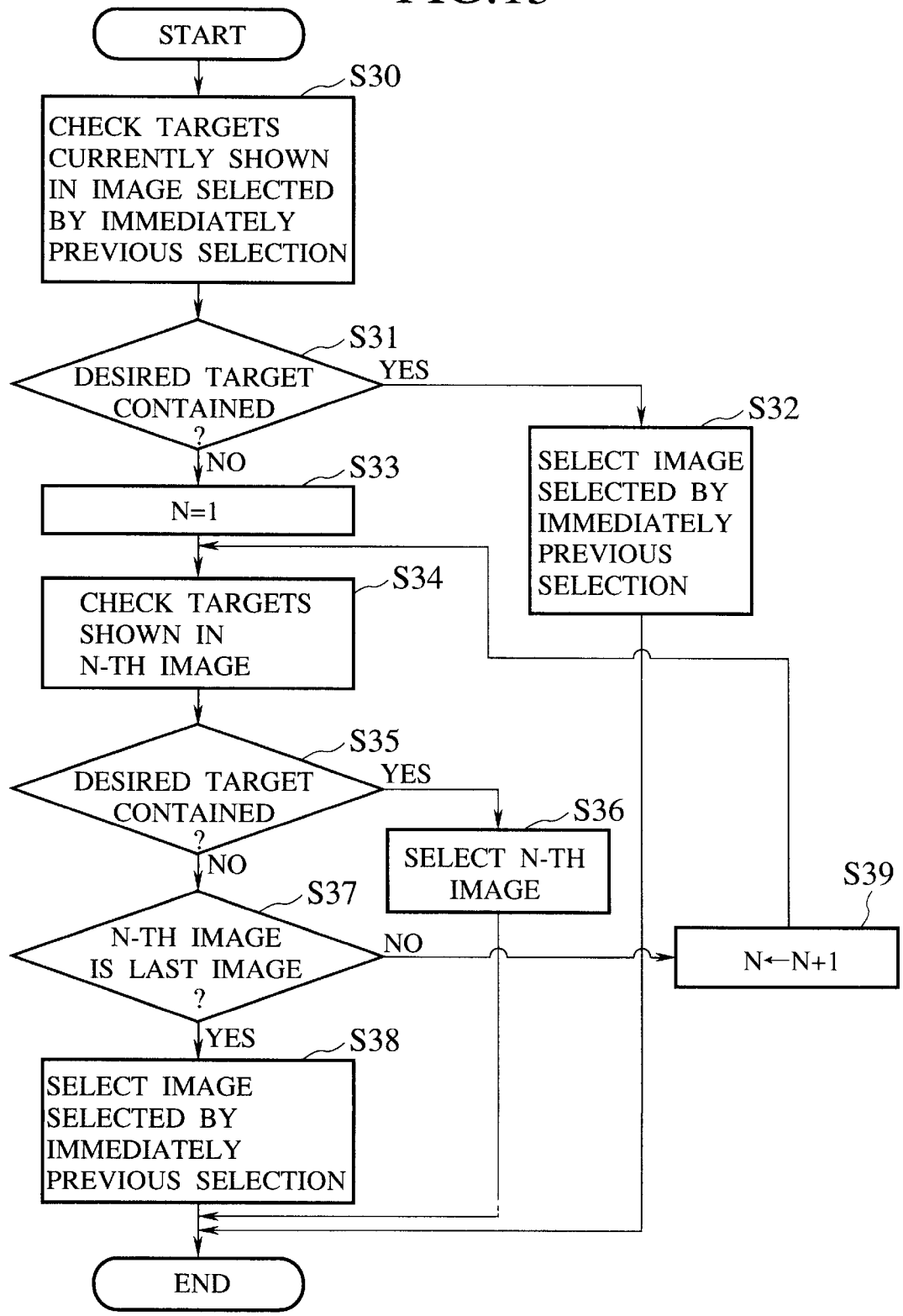
FIG. 13 is a flow chart for the operation of an image transmission system in the fourth embodiment of the present invention.

Referring now to FIG. 12 and FIG. 13, the fourth embodiment of a method and an apparatus for image selection according to the present invention will be described in detail.

This fourth embodiment is also directed to a case where the images to be selected are video images.

Suppose here that there are N sets of video images to be selected, and among them, the video image MP1 and the video image MP2 have time zones at which the desired target is shown and time zones at which the desired target is not shown, as indicated in FIG. 12.

In such a situation, consider a case of applying the image selection device 6 of FIG. 1, for example, so that the image selection unit 4 selects the image according to the operation of FIG. 3, and re-selects the image according to the operation of FIG. 3 again when a change occurs in the feature information entered from the target recognition unit 2.

At the time t1, the image selection unit 4 selects the video image MP2. Then, as time elapsed to the time t2, the image selection unit 4 selects the video image MP1 this time, but at the time t2+dt, the image selection unit 4 selects the video image MP2 again. Similarly, the video image MP1 is selected at the time t3 but the video image MP2 is selected at the time t3+dt again, and the video image MP1 is selected at the time t4 but the video image MP2 is selected at the time t4+dt again. Here, if dt is a very short period of time, this operation results in the instantaneous switching of the display from the video image MP2 to the video image MP1 at the times t2, t3 and t4 which is quickly switched back to the original display of the video image MP2, so that the displayed video image at the image display device 5 becomes hard to watch for the viewer.

In order to avoid such an undesired state, this fourth embodiment uses the operation according to the flow chart of FIG. 13, for example.

At the image selection unit 4 of the image selection device 6, when an occurrence of a change in the feature information entered from the target recognition unit 2 is detected, or at the predetermined regular time interval, the processing to select the image showing the desired target of the viewer from a plurality of images sent from the image source 1 is started.

At this point, the targets currently shown in the image selected by the immediately previous selection are checked (step S30). When the desired target specified by the viewer is contained in these currently shown targets (step S31 YES), the image selected by the immediately previous selection is selected again (step S32) so as to continue to display the same image at the image display device 5.

On the other hand, when the desired target specified by the viewer is not contained in these currently shown targets (step S31 NO), a variable N for counting a number of images entered at the image selection unit 4 is initially set to "1" (step S33).

Then, at the target recognition unit 2, targets shown in the N-th image are recognized and the feature information for the recognized targets are outputted to the image selection unit 4 (step S34). The image selection unit 4 checks whether the targets expressed by the feature information for the targets shown in the N-th image as entered from the target recognition unit 2 contains a target matching with the desired target expressed by the feature information for the desired target of the viewer as entered from the selection target indication device 3 (step S35), and when the matching target exists, this N-th image is selected (step S36) and the operation is terminated.

On the other hand, when the N-th image does not contain any matching target, whether this N-th image is the last image or not is checked (step S37). When this N-th image is not the last image so that there are other images to be checked, the variable N is incremented by "1" (step S39), and the operation returns to the step S34. This process is repeated until the image containing the desired target of the viewer is found at the step S35, or the checking of all the images is finished at the step S37.

When it is judged that the N-th image is the last image at the step S37, the image selected by the immediately previous selection is selected again (step S38) so as to continue to display the same image at the image display device 5.

By means of this operation of FIG. 13, the video image MP2 will be continually selected from the time t1 to the time t5 in FIG. 12, so that it is possible to avoid the undesired state in which the display at the image display device 5 is quickly switched among different video images.

Figure 14:
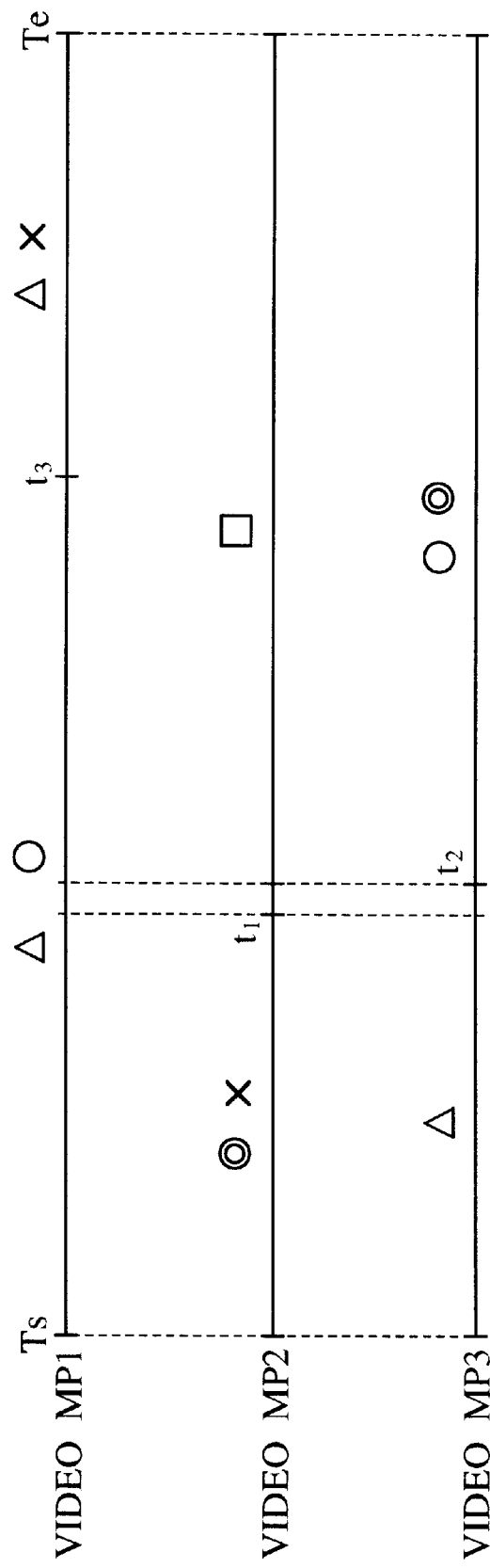
FIG. 14 is a diagram for explaining exemplary video images used in the fifth embodiment of the present invention.
Figure 15:
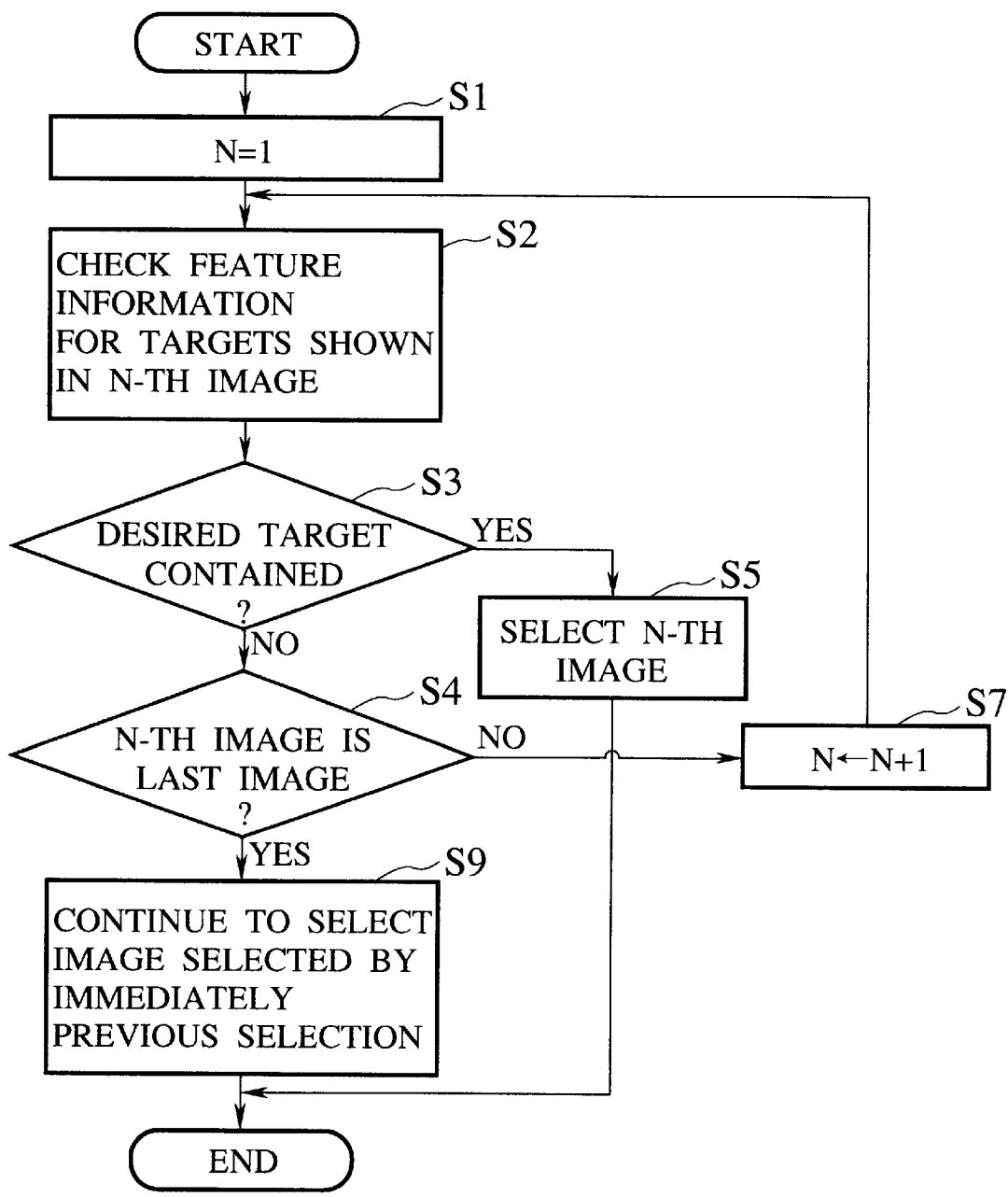
FIG. 15 is a flow chart for the operation of an image transmission system in the fifth embodiment of the present invention.

Referring now to FIG. 14 and FIG. 15, the fifth embodiment of a method and an apparatus for image selection according to the present invention will be described in detail. This fifth embodiment is also directed to a case where the images to be selected are video images.

Suppose here that the double circle is specified as the desired target with respect to the three video images MP1 to MP3 as shown in FIG. 14, and the image selection unit 4 of the image selection device 6 shown in FIG. 1 is applied to select the image according to the operation of FIG. 11. When the image selection unit 4 detects an occurrence of a change in the feature information entered from the target recognition unit 2, the image showing the desired target of the viewer is selected again from the plurality of images according to the operation of FIG. 11.

According to this operation procedure, as shown in FIG. 14, the video image MP2 is selected from the time T2 to the time t1, the video image MP1 is selected from the time t1 to the time t2, and the video image MP3 is selected from the time t2 to the time Te, but the switching from the video image MP2 to the video image MP1 at the time t1 is an unnecessary selection as it is meaningless for the viewer who wishes to watch the double circle. Also, when the period between t1 and t2 is very short, the successive switching of video image MP3 →video image MP1 →video image MP2 can make the displayed video image hard to watch for the viewer.

In order to avoid such an undesired state, this fifth embodiment uses the operation according to the flow chart of FIG. 15, for example. In FIG. 15, those steps which are substantially the same as the corresponding steps of FIG. 11 are given the same reference numerals in the figure, and only the steps different from those of FIG. 11 will be described here. More specifically, the operation of FIG. 15 differs from the operation of FIG. 11 in that the step S8 of FIG. 11 is replaced by the step S9.

At this step S9, when there is no image which shows the desired target of the viewer among a plurality of images entered from the image source 1 to the image selection device 6, the image selected by the immediately previous selection is selected continuously.

Then, when the image selection unit 4 detects an occurrence of a change in the feature information entered from the target recognition unit 2, the selection of the image showing the desired target of the viewer among these plurality of images is carried out again according to the operation of FIG. 15.

By means of this operation, in a case shown in FIG. 14, the video image MP2 is selected from the time Ts to the time t2, and the video image MP3 is selected from the time t2 to the time Te, so that it is possible to avoid the undesired state in which the unnecessary selection is made.

As described, according to the third to fifth embodiments, especially in a case of handling the video images, it is possible to avoid the unnecessary switching of the displayed video image at the image display device 5 at a time of selecting the video image containing the desired target of the viewer from a plurality of video images.

Thus, according to the present invention, it is possible to provide a method and an apparatus for image selection in an image transmission system for transmitting images from an image source to an image display device, capable of eliminating a need for the viewer to select the desired image by actually watching individual images and easily selecting the desired image in which a specific desired target of the viewer is shown.

In addition, according to the present invention, it is also possible to provide a method and an apparatus for image selection in an image transmission system, capable of avoiding unnecessary image switching at an image display device in a case of selecting a desired video image of the viewer from a plurality of video images.

It is to be noted that only rather simple examples of images and cases are used in the above descriptions for the sake of clarity of the explanation, but the present invention is widely applicable to a variety of more practical examples of images and cases encountered in the usual TV broadcast. In particular, the present invention is expected to be effective for a case of broadcasting the theater performance as well as for a case of broadcasting any kind of race other than the horse race described above.

It is also to be noted that the above described embodiments are directed to a simplest case of selecting just one image from a plurality of images, but the present invention can be adapted in an obvious manner to a case of selecting more than one images if desired.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the image selection device in any of the above described configurations of FIG. 1, FIG. 4, FIG. 7 and FIG. 8 can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for selecting a desired video image of a viewer from a plurality of video images provided by an image source, in an image transmission system for transmitting video images from the image source to an image display device, the method comprising the steps of:

sequentially obtaining feature information for identifying targets shown in each of said plurality of video images;

entering a desired feature information for identifying a desired target of the viewer; and sequentially selecting the desired video image which contains the desired target of the viewer from said plurality of video images according to the feature information sequentially obtained at the sequentially obtaining step and the desired feature information entered at the entering step.

2. The method of claim 1, wherein when none of said plurality of video images contains the desired target specified by the viewer, the sequentially selecting step selects one of said plurality of video images according to a prescribed selection rule.

3. The method of claim 2, wherein the prescribed selection rule specifies a prescribed one of said plurality of video images as an image to be selected.

4. The method of claim 1, wherein the sequentially obtaining step sequentially obtains the feature information by recognizing targets shown in each of said plurality of images video provided by the image source.

5. The method of claim 1, wherein the sequentially obtaining step sequentially obtains the feature information which is generated In advance in correspondence to said plurality of video images provided by the image source.

6. A method for selecting a desired video image of a viewer from a plurality of video images provided by an image source, in an image transmission system for transmitting video images from the image source to an image display device, the method comprising the steps of:

sequentially obtaining feature information for identifying targets shown in each of said plurality of video images at sequential timings;

entering a desired feature information for identifying a desired target of the viewer; and sequentially selecting the desired video image which contains the desired target of the viewer from said plurality of video images according to the feature information sequentially obtained at the sequentially obtaining step and the desired feature information entered at the entering step when a prescribed image selection condition is satisfied.

7. The method of claim 6, wherein the prescribed image selection condition is satisfied when a change occurs in the feature information sequentially obtained at the sequentially obtaining step.

8. The method of claim 6, wherein the prescribed image selection condition is satisfied when a change occurs in the feature information for a currently selected image sequentially obtained at the sequentially obtaining step.

9. The method of claim 6, wherein the prescribed image selection condition is satisfied when the feature information for the desired target of the viewer disappears from the feature information for a currently selected image sequentially obtained at the sequentially obtaining step.

10. The method of claim 6, wherein the prescribed image selection condition is satisfied when a prescribed time elapsed since an immediately previous image selection.

11. The method of claim 6, wherein when none of said plurality of video images contains the desired target of the viewer, the selecting step continues to select one of said plurality of images which was selected by an immediately previous image selection.

12. The method of claim 6, wherein when a currently selected image contains the desired target of the viewer at a time of image selection, the selecting step continues to select one of said plurality of images which was selected by an immediately previous image selection.

13. The method of claim 6, wherein the sequentially obtaining step sequentially obtains the feature information by recognizing targets shown in each of said plurality of video images provided by the image source.

14. The method of claim 6, wherein the sequentially obtaining step sequentially obtains the feature information which is generated in advance in correspondence to said plurality of video images provided by the image source.

15. An apparatus for selecting a desired video image of a viewer from a plurality of video images provided by an image source, at a viewer side in an image transmission system for transmitting video images from the image source to an image display device, the apparatus comprising:

means for sequentially obtaining feature information for identifying targets shown in each of said plurality of video images;

means for entering a desired feature information for identifying a desired target of the viewer; and means for sequentially selecting the desired video image which contains the desired target of the viewer from said plurality of video images according to the feature information sequentially obtained by the sequentially obtaining means and the desired feature information entered by the entering means.

16. An apparatus for selecting a desired video image of a viewer from a plurality of video images provided by an image source, at an image source side in an image transmission system for transmitting video images from the image source to an image display device, the apparatus comprising:

means for sequentially obtaining feature information for identifying targets shown in each of said plurality of video images; and means for receiving a desired feature information for identifying a desired target of the viewer from a viewer side, and sequentially selecting the desired video image which contains the desired target of the viewer from said plurality of video images according to the feature information sequentially obtained by the sequentially obtaining means and the desired feature information received from the viewer side.

17. An apparatus for selecting a desired video image of a viewer from a plurality of video images provided by an image source, at a viewer side in an image transmission system for transmitting video images from the image source to an image display device, the apparatus comprising:

means for entering a desired feature information for identifying a desired target of the viewer; and means for receiving feature information for identifying targets shown in each of said plurality of video images, the feature information being generated at an image source side in correspondence to said plurality of video images and provided from the image source side, and sequentially selecting the desired video image which contains the desired target of the viewer from said plurality of video images according to the feature information received from the image source side and the desired feature information entered by the entering means.

18. An apparatus for selecting a desired video image of a viewer from a plurality of video images provided by an image source, at an image source side in an image transmission system for transmitting video images from the image source to an image display device, the apparatus comprising:

means for providing feature information for identifying targets shown in each of said plurality of video images, the feature information being generated in correspondence to said plurality of video images at an image source side; and means for receiving a desired feature information for identifying a desired target of the viewer from a viewer side, and sequentially selecting the desired video image which contains the desired target of the viewer from said plurality of video images according to the feature information provided by the providing means and the desired feature information received from the viewer side.

19. An article of manufacture, comprising:

a computer usable medium having computer readable program code means embodied therein for causing a computer to function as a device for selecting a desired video image of a viewer from a plurality of video images provided by an image source in an image transmission system for transmitting video images from the image source to an image display device, the readable program code means including:

first computer readable program code means for causing said computer to sequentially obtain feature information for identifying targets shown in each of said plurality of video images;

second computer readable program code means for causing said computer to receive a desired feature information for identifying a desired target of the viewer from a viewer side; and third computer readable program code means for causing said computer to sequentially select the desired video image which contains the desired target of the viewer from said plurality of video images according to the feature information sequentially obtained by the first computer readable program code means and the desired feature information received by the second computer readable program code means.

20. An article of manufacture, comprising:

a computer usable medium having computer readable program code means embodied therein for causing a computer to function as a device for selecting a desired video image of a viewer from a plurality of video images provided by an image source in an image transmission system for transmitting video images from the image source to an image display device, the computer readable program code means including:

first computer readable program code means for causing said computer to receive feature information for identifying targets shown in each of said plurality of video images from an image source side;

second computer readable program code means for causing said computer to receive a desired feature information for identifying a desired target of the viewer from a viewer side; and third computer readable program code means for causing said computer to sequentially select the desired video image which contains the desired target of the viewer from said plurality of video images according to the feature information received by the first computer readable program code means and the desired feature information received by the second computer readable program code means.

* * * * *